(12) United States Patent
Sohn et al.

(10) Patent No.: US 8,436,832 B2
(45) Date of Patent: May 7, 2013

(54) MULTI-TOUCH SYSTEM AND DRIVING METHOD THEREOF

(75) Inventors: Min Ho Sohn, Anyang-si (KR); Jong Seong Choi, Anyang-si (KR); Hyung Uk Jang, Seongnam-si (KR); Sang Hyuck Bae, Seoul (KR); Byung Chun Yu, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 596 days.

(21) Appl. No.: 12/318,535

(22) Filed: Dec. 30, 2008

(65) Prior Publication Data
US 2009/0251425 A1 Oct. 8, 2009

(30) Foreign Application Priority Data
Apr. 8, 2008 (KR) .................. 10-2008-0032501

(51) Int. Cl.
G09G 5/00 (2006.01)
G06F 3/033 (2006.01)
G06F 3/041 (2006.01)
G06F 3/042 (2006.01)
G06K 11/06 (2006.01)
G08C 21/00 (2006.01)

(52) U.S. Cl.
USPC ........... 345/175; 345/156; 345/157; 345/173; 178/18.01; 178/18.02; 178/18.03; 178/18.09

(58) Field of Classification Search .................. 345/156, 345/157, 173, 175
See application file for complete search history.

(56) References Cited

U.S. PATENT DOCUMENTS

| | | | |
|---|---|---|---|
| 5,982,302 A * | 11/1999 | Ure .................................. 341/22 |
| 7,973,777 B2 * | 7/2011 | Lee et al. ....................... 345/175 |
| 2004/0179001 A1 * | 9/2004 | Morrison et al. .............. 345/179 |
| 2008/0143690 A1 * | 6/2008 | Jang et al. ..................... 345/175 |
| 2009/0128499 A1 * | 5/2009 | Izadi et al. .................... 345/173 |
| 2009/0231281 A1 * | 9/2009 | Whytock et al. .............. 345/168 |
| 2009/0243998 A1 * | 10/2009 | Wang ............................ 345/156 |

* cited by examiner

Primary Examiner — Bipin Shalwala
Assistant Examiner — Ilana Spar
(74) Attorney, Agent, or Firm — McKenna Long & Aldridge, LLP

(57) ABSTRACT

Provided are a multi-touch system and a driving method thereof. The method includes, extracting using a digital processor a touch frequency and at least one angle associated with at least one touch from image information captured by each of at least two cameras, selecting a touch mode on the basis of sum value of the touch frequencies extracted from the image information captured by the cameras, and performing a touch function corresponding to the selected touch mode using a user interface.

18 Claims, 5 Drawing Sheets

| CAMERA 1 + CAMERA 2 (TOUCH FREQUENCY) | TOUCH MODE | FUNCTION |
|---|---|---|
| 2 | TOUCH = 1 | PERFORM MOUSE LEFT BUTTON |
| 3~4 | TOUCH = 2 | PERFORM MOUSE RIGHT BUTTON |
| 5~10 | TOUCH = 3 | PERFORM MOUSE SCROLL BUTTON |
| 11~20 | TOUCH = 4 | TURN ON/OFF VIRTUAL KEYBOARD |

Fig.6B
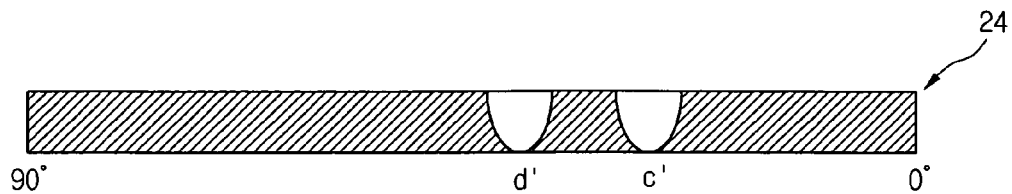
Fig.7
| CAMERA 1 + CAMERA 2 (TOUCH FREQUENCY) | TOUCH MODE | FUNCTION |
|---|---|---|
| 2 | TOUCH = 1 | PERFORM MOUSE LEFT BUTTON |
| 3~4 | TOUCH = 2 | PERFORM MOUSE RIGHT BUTTON |
| 5~10 | TOUCH = 3 | PERFORM MOUSE SCROLL BUTTON |
| 11~20 | TOUCH = 4 | TURN ON/OFF VIRTUAL KEYBOARD |
Fig.8
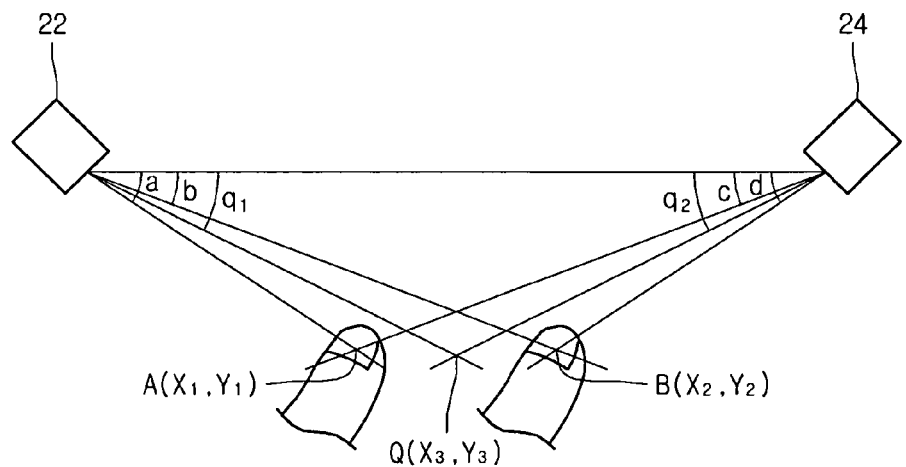

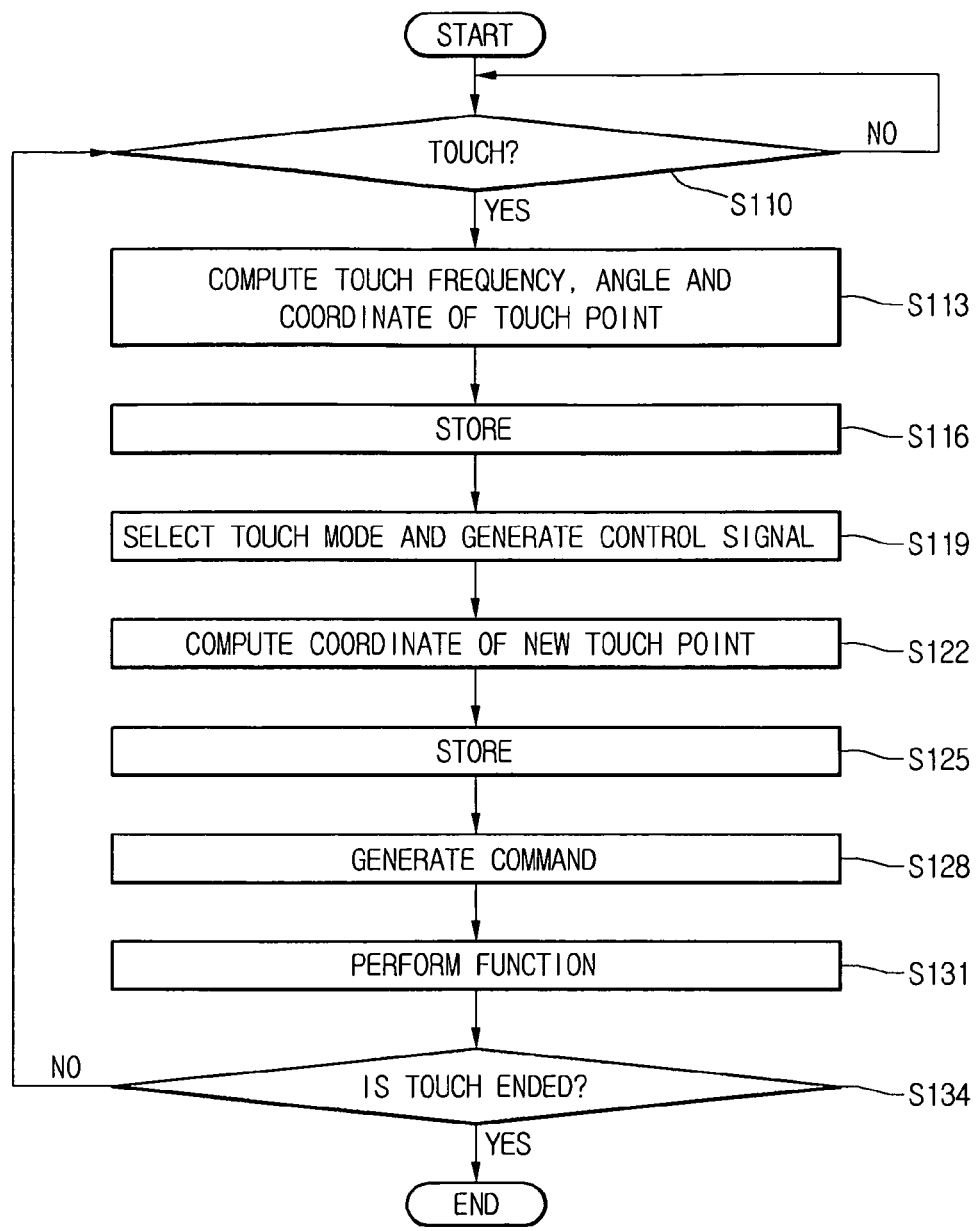

MULTI-TOUCH SYSTEM AND DRIVING METHOD THEREOF

This application claims the benefit of Korean Patent Application No. 10-2008-0032501, filed on Apr. 8, 2008, which is hereby incorporated by reference in its entirety for all purposes as if fully set forth herein.

BACKGROUND OF THE INVENTION

1. Field of the Invention

The present invention relates to a multi-touch system, and more particularly, to a multi-touch system that can realize a variety of functions using multi-touch, and a driving method thereof.

2. Discussion of the Related Art

With the development of an information-oriented society, display devices for delivering information to a user are being actively developed Information may be provided to the display device by various input devices, for example, a mouse and a keyboard, and can be output for delivery to a third party using various output units, for example, a printer and a fax unit.

However, as various input/output devices are connected to the display device, the areas occupied by the input/output devices increase, and the number of connection lines between the display device and the input/output devices increases.

Therefore, a display device having an input/output function therein is under development recently.

For example, a mouse function is added to a display device, so that a separate mouse device does not need to be connected to the display device.

To realize an input function in a display device, a device that can recognize the touch operation of a user is required.

The recognition device can be realized in a capacitance type, a resistance type, an infrared (IR) matrix type, or a camera type.

In the capacitance type and resistance type recognition devices, a variable material that varies capacitance or resistance is included in the panel of a display device, so that the touch operation of a user can be recognized as capacitance or resistance changes due to the touch operation of the user.

In the IR matrix type recognition device, infrared sensors generating light are disposed at a corner on one side of the panel of the display device, and photo sensors receiving light of the infrared sensors are disposed on a corner on the other side, so that the touch operation of the user can be recognized.

In the camera type recognition device, two cameras are installed in the edge regions of the display device to generate the touch operation of a user in the form of an image, so that the touch operation of the user can be recognized.

However, the camera type recognition device can perform only one function corresponding to one touch. (For example, there are some icons displayed on a panel and each only correspond to one function. When the user touches one icon on the panel and the touch is recognized and the function corresponding to the touch is performed by it too). Therefore, various functions cannot be performed.

Recently, a type of recognition device that can perform various functions corresponding to multi-touch is studied but a specific realization method has not been proposed up to now.

SUMMARY OF THE INVENTION

Accordingly, the present invention is directed to a multi-touch system and driving method thereof that substantially obviates one or more of the problems due to limitations and disadvantages of the related art.

Embodiments provide a multi-touch system that can realize a multi-touch to perform various functions, and a driving method thereof.

Embodiments also provide a multi-touch system that can perform various functions corresponding to multi-touches in a camera type or an IR matrix type, and a driving method thereof.

Embodiments also provide a multi-touch system that can perform various functions by connecting a multi-touch with an operating system (OS), and a driving method thereof.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method for driving a multi-touch system includes: extracting using a digital processor a touch frequency and at least one angle associated with at least one touch from image information captured by each of at least two cameras; selecting a touch mode on the basis of sum value of the touch frequencies extracted from the image information captured by the cameras; and performing a touch function corresponding to the selected touch mode using a user interface.

In another aspect of the present invention, a multi-touch system includes: a touch recognition unit generating at least two image information; a digital processor calculating a frequency of touch and angles from each image information; a controller selecting a touch mode in response to the sum value of the calculated frequency of the touch from the at least two image information; and a user interface performing a touch function corresponding to the touch mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIGS. 6A and 6B are views illustrating image information generated by each camera for the overlapped touch of of FIG. 5.

FIG. 7 is a view illustrating a table including the frequency of touch and a touch mode.

FIG. 8 is a view illustrating a method for calculating a new touch point.

FIG. 9 is a flowchart explaining a method for driving a multi-touch system according to an embodiment of the invention.

DETAILED DESCRIPTION OF THE ILLUSTRATED EMBODIMENTS

Reference will now be made in detail to the embodiments of the present disclosure, examples of which are illustrated in the accompanying drawings.

In this description, a multi-touch refers to a touch by a plurality of fingers at a time. For example, a two-touch means two of ten fingers of a user are touched at a time, and an eight-touch means eight of ten fingers of the user are touched at a time.

Embodiments of the invention may employ at least two cameras. When a multi-touch is recognized using two or more cameras, actual touch points as well as virtual image touch points can be calculated. The actual touch points are points actually touched by a user, while the virtual image touch points are virtual points obtained by calculation. The virtual image touch points are indispensably computed in the case where the multi-touch is recognized by two or more cameras.

Figure 3:
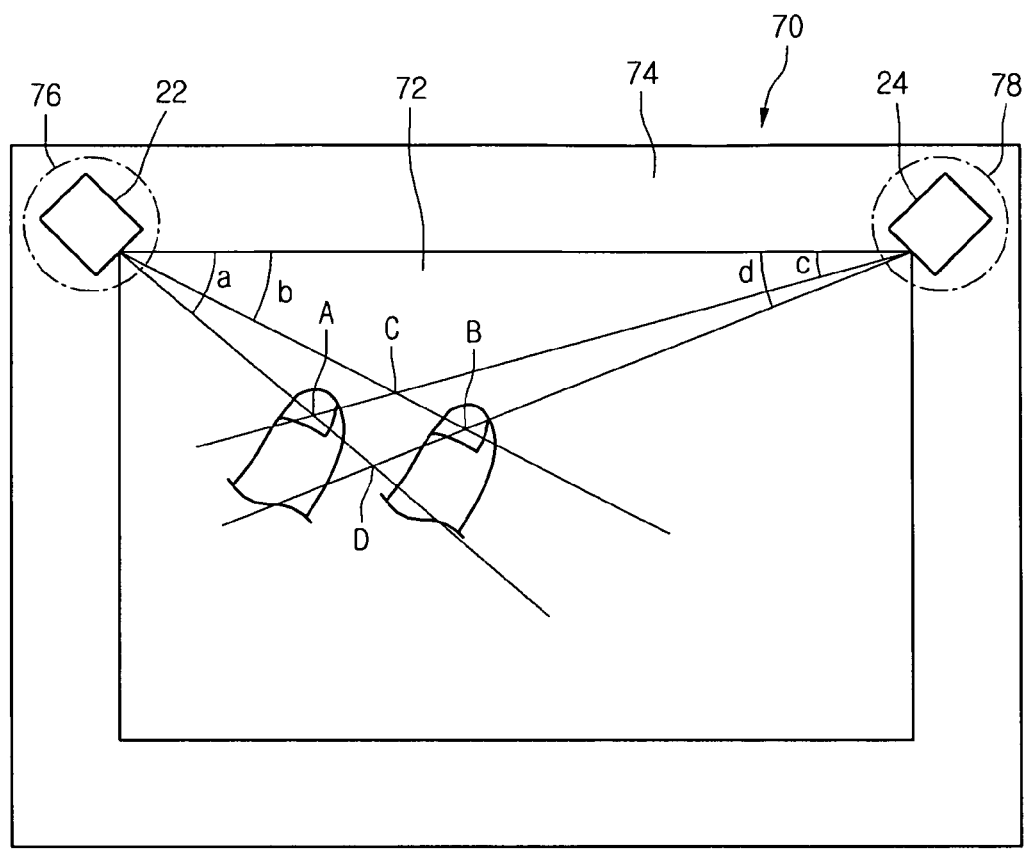
FIG. 3 is a view illustrating the touch recognition unit of FIG. 1 disposed on a panel.

For example, in case of a two-touch as illustrated in FIG. 3, two actual touch points A and B and two virtual image touch points C and D can be computed.

According to an embodiment of the invention, the frequency of touch of actual touch points touched at a time is computed, and different functions can be performed according to the computed frequency of touch. Therefore, according to an embodiment, different functions can be performed according to the frequency of touch of actual touch points actually touched and displayed by each camera.

Figure 1:
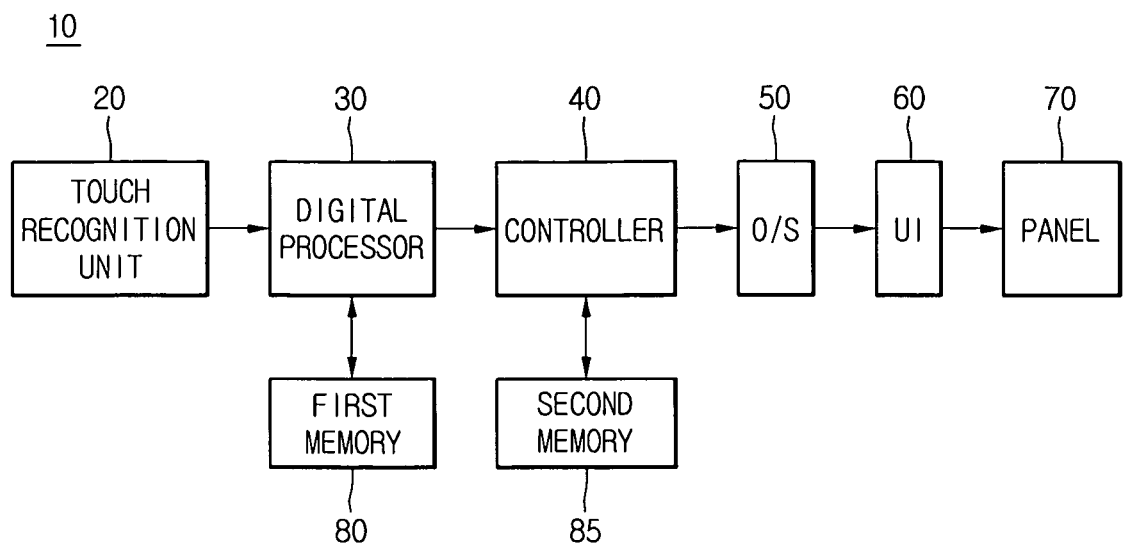
FIG. 1 is a block diagram of a multi-touch system.
Figure 2:
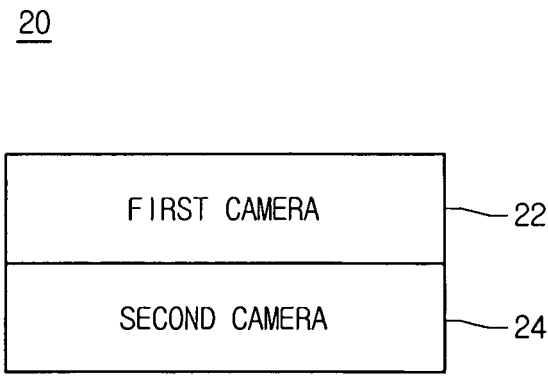
FIG. 2 is a block diagram illustrating the touch recognition unit of FIG. 1.

FIG. 1 is a block diagram of a multi-touch system, FIG. 2 is a block diagram illustrating the touch recognition unit of FIG. 1, and FIG. 3 is a view illustrating the touch recognition unit of FIG. 1 disposed on a panel.

Referring to FIG. 1, the multi-touch system 10 can include a touch recognition unit 20, a digital processor 30, a controller 40, an operating system 50, a user interface 60, a panel 70, and first and second memories 80 and 85.

The panel 70 can be any display panel capable of displaying an image. For example, the panel can be one of a liquid crystal display panel, a plasma display panel (PDP), an organic electro-luminescence display panel, a light emitting diode panel, and a field emission display (FED) panel.

Referring to FIG. 2, the touch recognition unit 20 includes the first and second cameras 22 and 24.

Referring to FIG. 3, the first and second cameras 22 and 24 can be disposed on the panel 70.

The panel 70 includes a display region 72 on which an image is displayed and a non-display region 74 on which an image is not displayed.

The first and second cameras 22 and 24 can be disposed on the non-display region 74 of the panel 70. That is, the first camera 22 can be disposed on the first corner region 76 of the non-display region 74 of the panel 70, and the second camera 24 can be disposed on the second corner region 78 of the non-display region 74 of the panel 70.

The first and second cameras 22 and 24 are optical sensors and can, for example, be complementary metal oxide semiconductor (CMOS) devices or charged coupled devices (CCDs).

The display region 72 of the panel 70 has a quadrangular shape, with the angle at respective corner regions 76 and 78 of the display region 72 being 90°.

Therefore, since the first and second cameras 22 and 24 disposed in the non-display region 74 of the panel 70 should cover the display region 72, the viewing angles of the first and second cameras 22 and 24 may be in the range of 0-90°. The fingers of the user touched on the display region 72 of the panel 70 can be recognized by the first and second cameras 22 and 24 having this range of viewing angle.

Although only two cameras 22 and 24 are shown in FIG. 2, for the purposes of illustration and description, the present invention is not limited thereto, and the invention can be readily implemented using three or more cameras.

Figure 4A:
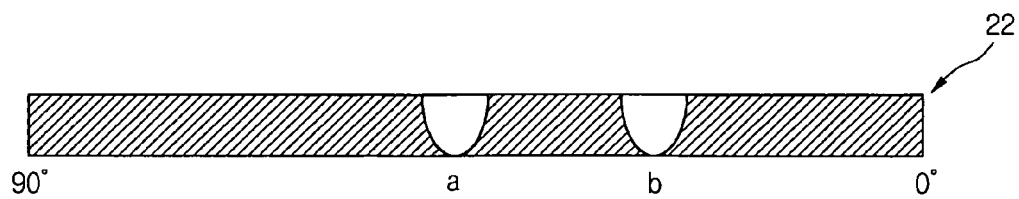
FIGS. 4A and 4B are views illustrating image information generated by each camera.
Figure 4B:
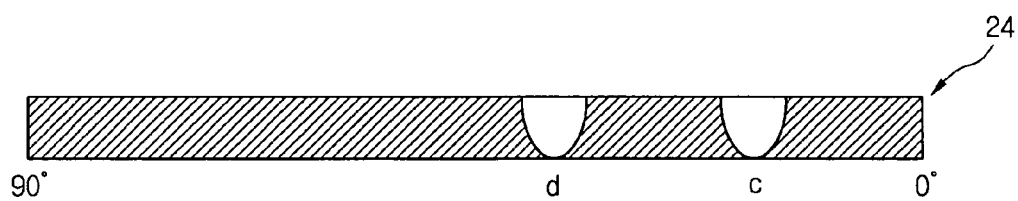

Referring to FIG. 3, in the case where a two-touch by a user's two fingers is made, the two-touch is recognized by the first and second cameras 22 and 24 and generated as first and second image information as illustrated in FIGS. 4A and 4B. Touch points and the angles of the touch points can be displayed on each of the first and second image information. The touch points mean points actually touched by the user.

The first and second image information of a touch generated by the first and second cameras 22 and 24 is provided to the digital processor 30.

The digital processor 30 can extract the frequency of touches of touch points and the angle of each touch point from the first and second image information provided by the first and second cameras 22 and 24.

For example, referring to FIG. 3, in the case where a two-touch is made on the display region 72 of the panel 70, two times of the frequency of touches and angles (a, b) can be extracted from the first image information generated by the first camera 22, and two times of the frequency of touches and angles (c, d) can be extracted from the second image information generated by the second camera 24.

The digital processor 30 can compute coordinates of two actual touch points A and B (referred to as first and second touch points) using triangulation technique on the basis of first and second angles a and b of each touch point recognized by the first camera and third and fourth angles c and d of each touch point recognized by the second camera.

When the coordinates of such actual touch points A and B are computed, virtual image touch points C and D corresponding to points not actually touched by a user can be generated. That is, in the case where the first camera 22 is connected to the touch point A by the first angle using a first line, and the second camera 24 is connected to the touch point B by a fourth angle d using a second line, a virtual image touch point D can exist at a point where the first and second lines cross each other. Additionally, in the case where the first camera 22 is connected to the touch point B by the second angle b using a third line, and the second camera 24 is connected to the touch point A by a third angle c using a fourth line, a virtual image touch point C can exist at a point where the third and fourth lines cross each other.

However, an embodiment can be realized even when the coordinates of the virtual image touch points C and D cannot be traced because the embodiment uses the frequency of touches of actual touch points touched at a time, rather than simply using the coordinates of the touch points.

In an embodiment, the coordinates of two actual touch points A and B can be computed. That is, the first touch point A can be computed using the first angle a recognized by the first camera 22 and the third angle c recognized by the second camera 24. The second touch point B can be computed using the second angle b recognized by the first camera 22 and the fourth angle d recognized by the second camera 24.

Referring to FIGS. 4A and 4B, the angles of the first and second touch points A and B recognized by the first camera 22 can be the first and second angles a and b, and the angle of the first and second touch points A and B recognized by the second camera 24 can be the third and fourth angles c and d.

The digital processor 30 stores the frequency (i.e. the count) of touches of actual touch points A and B extracted by the first camera 22, the frequency of touches of the actual touch points A and B extracted by the second camera 24, and the coordinates of the actual touch points A and B computed from angles a, b, c, and d extracted by the first and second cameras 22 and 24 in the first memory 80. Referring to FIGS. 4A and 4B, the frequency of touches extracted by the first and second cameras 22 and 24 can be two times.

Here, it should be noted that the frequency of touches actually made at a time by the user can be different from the frequency of touches of touch points extracted by the respective cameras 22 and 24. For example, even when the frequency actually made at a time by the user is two times, the frequency of touches extracted by one of the first and second cameras 22 and 24 can be one time.

Figure 5:
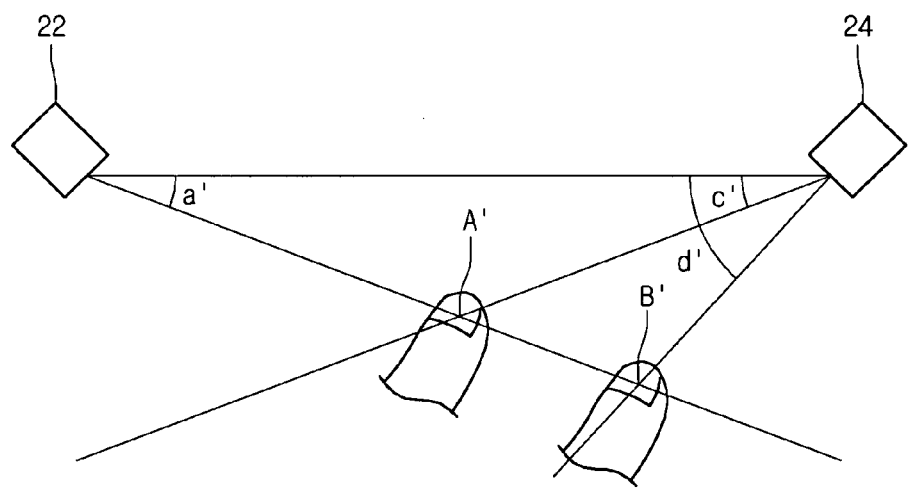
FIG. 5 is a view illustrating an overlap of a touch.
Figure 6A:
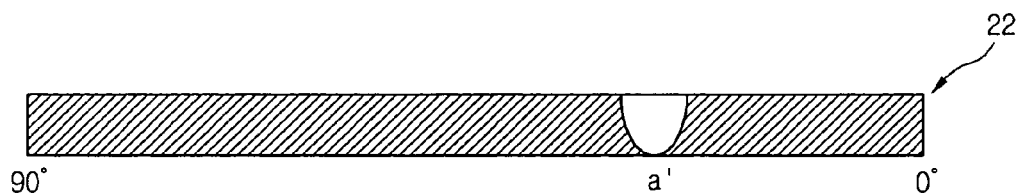

Referring to FIG. 5, in the case where two times of touches are made in parallel to the recognition direction of the first camera 22, the frequency of touches extracted by the first camera 22 can be one time as illustrated in FIG. 6A and the frequency of touches extracted by the second camera 24 can be two times as illustrated in FIG. 6B. That is, in the case where two times of touches are made in parallel to the recognition direction of the first camera 22, first and second touch points a' and b' are parallel to the recognition direction of the first camera 22 and the first touch point a' overlaps the second touch point b' and thus the second touch point b' is not recognized by the first camera 22. Accordingly, the frequency of touches recognized by the first camera 22 can be one time. On the other hand, the frequency of touches extracted by the second camera 24 can be two times, and is equal to the frequency of touches actually made by the user.

A multi-touch panel according to an embodiment of the invention can combine the frequency of touches extracted by the first and second cameras 22 and 24 in consideration of the above circumstance to perform different functions corresponding to the frequency of touches without an error in selecting the intended function, as will be described below.

A plurality of touch modes according to the frequency of touches extracted by the first and second cameras 22 and 24 can be set as a table in the second memory 85.

Referring to FIG. 7, the correspondence between the summed frequency of touches by the first and second cameras 22 and 24, and the corresponding touch modes are set in the table set in the second memory 85. The summed frequency of touches can be sum of the frequency of touches extracted by the first camera 22 and the frequency of touches extracted by the second camera 24.

For example, when the summed frequency of the first and second cameras 22 and 24 is two times, a touch mode can be set to '1'. When the summed frequency of the first and second cameras 22 and 24 is one of three times and four times, a touch mode can be set to '2'. When the summed frequency of the first and second cameras 22 and 24 is one of five times to ten times, a touch mode can be set to '3'. When the summed frequency of the first and second cameras 22 and 24 is one of eleven times to twenty times, a touch mode can be set to '4'.

In the example illustrated in FIG. 7, the touch mode '1' is a mode for performing a mouse left button, the touch mode '2' is a mode for performing a mouse right button, the touch mode '3' is a mode for performing a mouse scroll button, and the touch mode '4' is a mode for toggling the virtual keyboard on and off. When the touch mode '4' is selected initially, a virtual keyboard is displayed on the panel 70. When the touch mode '4' is selected again, the virtual keyboard displayed on the panel 70 may disappear.

When a user touches with his one finger, the summed frequency of touches by the first and second cameras 22 and 24 can be two times. When the user touches with his two fingers at a time, the summed frequency of touches by the first and second cameras 22 and 24 can be three times or four times. For example, in the case where a two-touch is overlapped and only one touch is recognized by the first camera 22, and two times of number of time of touches corresponding to the two-touch are recognized by the second camera 24, the summed frequency of touches by the first and second cameras 22 and 24 can be three times. However, if a two-touch is not overlapped by either of the first and second cameras 22 and 24, two times of the frequency of touches is recognized by the first camera 22, and two times of the frequency of touches is recognized by the second camera 24, so that the summed frequency of touches by the first and second cameras 22 and 24 can be four times.

The above sum computation of the frequency of touches by the first and second cameras 22 and 24 shows that at least five times of summed frequency of touches can be made at a time by a user for the case of the touch mode '3', and eleven times of summed frequency of touches can be made at a time by a user for the case of the touch mode '4'.

Referring again to FIG. 2, the digital processor 30 reads the angle of each touch point, the frequency of touches, and the coordinate of each touch point recognized by each of the cameras 22 and 24 and stored in the first memory 80 and provides them to the controller 40.

The controller 40 computes a summed value of the frequency of touches recognized by the first and second cameras 22 and 24 and provided by the digital processor 30, selects a touch mode corresponding to the computed summed value from the table of the second memory 85, and provides a control signal corresponding to the selected touch mode to the operating system 50.

For example, the controller 40 can select the touch mode '1' from the second memory 85 and provide a first control signal corresponding to the touch mode '1' to the operating system 50 when the computed summed value is 2.

The controller 40 can select the touch mode '2' from the second memory 85 and provide a second control signal corresponding to the touch mode '2' to the operating system 50 when the computed summed value is 3 or 4.

The controller 40 can select the touch mode '3' from the second memory 85 and provide a third control signal corresponding to the touch mode '3' to the operating system 50 when the computed summed value is one of 5 to 10.

The controller 40 can select the touch mode '4' from the second memory 85 and provide a fourth control signal corresponding to the touch mode '4' to the operating system 50 when the computed summed value is one of 11 or 20.

Meanwhile, each of the cameras 22 and 24 can recognize a user's touch continuously to generate corresponding image information. For example, when the respective cameras 22 and 24 are driven at 60 Hz, they can generate image information of 60 frames per second. When the respective cameras 22 and 24 are driven at 120 Hz, they can generate image information of 120 frames per second.

The above described first and second image information can be generated at a specific time by the respective cameras 22 and 24.

In the case where a user touches the panel with at least two fingers, there is possibility that a small time difference is generated between touches by the fingers. When any finger is not touched due to a time difference between the touches by the fingers of the user, a touch point by the untouched finger is not formed on the first and second image information generated at a specific time by the respective cameras 22 and 24.

In this case, when the frequency of touches extracted by the respective cameras 22 and 24 at a particular time are summed to select a touch mode, a false touch mode may be selected and consequently a false touch function may be performed.

To solve this false touch mode problem, in an embodiment of the invention, the frequency of touches extracted from the first image information generated by the first camera 22 for each frame in a set of frames and the frequency of touches extracted from the second image information generated by the second camera 24 are summed, and the summed value of the frequency of touches is included in the summed frequency of touches in real-time by the first and second cameras 22 and 24 for selection of a specific touch mode as illustrated in FIG. 7, the specific touch mode can be finally selected. For example, the set frames of frames can be ten frames. To allow a specific touch mode, for example, the touch mode '4' to be selected, the summed frequency of touches by the cameras 22 and 24 extracted from each frame in the range of 50-100% of ten frames should be included in the range of summed frequency of touches by the first and second cameras 22 and 24 set to correspond to the specific mode.

For example, during a first frame, the frequency of touches extracted from the first image information by the first camera 22 and the frequency of touches extracted from the second image information by the second camera 24 are summed and the summed value can be included in the range (11 to 20) of the summed frequency of touches by the first and second cameras 22 and 24 set to correspond to the touch mode '4'.

During second to seventh frames, the summed frequency of touches extracted from the cameras 22 and 24 may be included in the range (11 to 20) of the summed frequency of touches by the first and second cameras 22 and 24 set to correspond to the touch mode '4'.

During eighth to tenth frames, the summed frequency of touches extracted from the cameras 22 and 24 may be included in the range (5 to 10) of the summed frequency of touches by the first and second cameras 22 and 24 set to correspond to the touch mode '3'.

In this case, since during seven frames of the total ten frames, the summed frequency of touches extracted from the cameras 22 and 24 is included in the range (11 to 20) of the summed frequency of touches by the first and second cameras 22 and 24 set to correspond to the touch mode '4', the touch mode '4' can be selected finally.

Though the number of frames is limited to ten in the embodiment, the number of frames is not limited thereto but the present invention can be can using a set of five frames, fifteen frames, twenty frames or more frames.

Additionally, the controller 40 averages the angles of respective touch points to compute an average angle, and computes a new touch point and a coordinate thereof using each average angle. Here, the coordinate of the new touch point can be used as a reference coordinate when a function corresponding to each touch mode is performed. For example, in the case where a mouse scroll button corresponding to the touch mode '3' is performed, an image disposed on the panel 70 can be moved to any one of up, down, left, and right directions. The reference coordinate can be used as a reference position for movement of an image.

A new touch point and a coordinate thereof computed by the controller 40 can be stored in the second memory 85.

For example, referring to FIG. 8, for a first touch point A and a second touch point B touched by a user, the angle of the first touch point A extracted by the first camera 22 is a, the angle of the second touch point B extracted by the first camera 22 is b, the angle of the first touch point A extracted by the second camera 24 is c, and the angle of the second touch point B extracted by the second camera 24 is d.

The coordinate (X1, Y1) of the first touch point A can be computed using the angles a and c extracted by the first and second cameras 22 and 24, and a distance between the first and second cameras 22 and 24. The coordinate (X2, Y2) of the second touch point B can be computed using the angles b and d extracted by the first and second cameras 22 and 24, and a distance between the first and second cameras 22 and 24.

Additionally, an angle q1, (where q1=(a+b)/2) can be computed by the averaging of the angles a and b extracted by the first camera 22, and an angle q2, (where q2=(c+d)/2) can be computed by the average of the angles c and d extracted by the second camera 24.

Accordingly, a coordinate (X3, Y3) of a new touch point Q can be computed by the computed angles q1 and q2, and a distance between the first and second cameras 22 and 24. Therefore, the coordinate (X3, Y3) of the new touch point Q can be used as a reference coordinate when a function corresponding to each touch mode is performed.

Referring again to FIG. 2, the operating system 50 provides a command corresponding to a control signal provided from the controller 40 to the user interface (UI) 60. The user interface 60 performs a function corresponding to the command provided from the operating system 50.

When a first control signal is provided from the controller 40, the operating system 50 can provide a first command corresponding to the first control signal to the user interface 60. Accordingly, the user interface 60 can perform pressing of a mouse left button in response to the first command.

A predetermined application is executed and displayed on the panel 70. When a user touches the panel 70 with one touch at a time, a one-touch is recognized by the first and second cameras 22 and 24, and the coordinate of a touch point touched by the user is computed by the digital processor 30.

The touch mode '1' is selected by the controller 40 on the basis of the frequency of touches recognized by the first and second cameras 22 and 24, respectively, and accordingly, a first control signal is provided to the operating system 50. At this point, the controller 40 can receive the coordinate of the touch point touched by the user from the digital processor 30 to provide the received coordinate to the operating system 50. The operating system 50 provides a first command corresponding to the first control signal together with the coordinate of the touch point to the user interface 60. Therefore, the user interface 60 performs pressing of a mouse left button at the touch point on the panel 70 in response to the first command.

When a second control signal is provided from the controller 40, the operating system 50 can provide a second command corresponding to a second control signal to the user interface 60. Accordingly, the user interface 60 can perform pressing of a mouse right button in response to the second command.

In the case where the user touches the panel 70 with two-touch at a time, one to two times of the frequency of touches are recognized by the first and second cameras 22 and 24, respectively, and the coordinates of first and second touch points touched by the user are computed by the digital processor 30.

The touch mode '2' is selected by the controller 40 on the basis of the frequency of touches recognized by the first and second cameras 22 and 24, respectively, and accordingly, a second control signal is provided to the operating system 50. Also, the controller 40 can average angles recognized by the first and second cameras 22 and 24 in association with the first and second touch points to compute a new touch point and a coordinate thereof and provide them to the operating system 50.

The operating system 50 provides a second command corresponding to the second control signal together with a new touch point to the user interface 60. Therefore, the user interface 60 performs pressing of a mouse right button at a new touch point on the panel 70 in response to the second command. As soon as the pressing of the mouse right button is performed, the user interface 60 can display a plurality of set menus.

In the case where a user touches the panel with five-touch at a time, one to five times of the frequency of touches are recognized by the first and second cameras 22 and 24, respectively, and the coordinates of five touch points touched by the user are computed by the digital processor 30.

The touch mode '3' is selected by the controller 40 on the basis of the frequency of touches recognized by the first and second cameras 22 and 24, respectively, and accordingly, a third control signal is provided to the operating system 50. Also, the controller 40 can average angles recognized by the first and second cameras 22 and 24 in association with the touch points to compute a new touch point and a coordinate thereof and provide them to the operating system 50.

The operating system 50 provides a third command corresponding to the third control signal together with the new touch point to the user interface 60. Therefore, the user interface 60 performs a mouse scroll button at a new touch point on the panel 70 to activate a mouse scroll in response to the third command.

In this case, a user should maintain five-touch of touch states. At this state, the user can scroll fingers to any one of up, down, left, and right directions. This scroll operation of the user is recognized by the first and second cameras 22 and 24, and corresponding information is delivered to the user interface 60 by way of the digital processor 30, the controller 40, and the operating system 50. Accordingly, the user interface 60 can move a screen displayed on the panel 70 along the scroll movement direction according to the user's scroll operation.

In the case where the user touches the panel 70 with ten-touch at a time, one to ten times of the frequency of touches are recognized by the first and second cameras 22 and 24, respectively, and the coordinates of ten touch points touched by the user are computed by the digital processor 30.

The touch mode '4' is selected by the controller 40 on the basis of the frequency of touches recognized by the first and second cameras 22 and 24, respectively, and accordingly, a fourth control signal is provided to the operating system 50. Also, the controller 40 can average angles recognized by the first and second cameras 22 and 24 in association with the touch points to compute a new touch point and a coordinate thereof and provide them to the operating system 50.

The operating system 50 provides a fourth command corresponding to the fourth control signal together with the new touch point to the user interface 60. Therefore, the user interface 60 turns on a virtual keyboard and displays the virtual keyboard using the new touch point on the panel 70 for a reference in response to the fourth command.

The display virtual keyboard can include character buttons, numerical buttons, and command buttons. The user can manipulate the character buttons, the numerical buttons, and the command buttons of the displayed virtual keyboard to input a desired character or number to the virtual keyboard, and can give a desired command.

Meanwhile, in the case where the user touches the panel 70 ten-touch at a time again, the user interface 60 turns off the virtual keyboard to remove the virtual keyboard that is being displayed on the panel 70.

FIG. 9 is a flowchart explaining a method for driving a multi-touch system according to an embodiment.

Referring to FIGS. 1 to 9, whether the user touches the panel 70 is recognized by the digital processor 30 (S110). When the user touches the panel 70, the user's touch is generated as first and second image information by the first and second cameras 22 and 24 disposed at the corner regions 22 and 24 of the panel 70. The first and second image information is provided to the digital processor 30. The digital processor 30 can recognize the user's touch from the first and second image information provided from the first and second cameras 22 and 24.

The user's touch information and angle information can be displayed in the first and second image information as illustrated in FIGS. 4A and 4B. The touch information can represent the frequency of touches touched at a time by a user, and the angle information can represent angles at which the touch points are recognized by the first and second cameras 22 and 24.

The digital processor 30 extracts the frequency of touches and angles from each of the first and second image information.

When the user's touch is recognized, the digital processor 30 computes the coordinates of the touch points A and B on the basis of the extracted angle information and the distance information between the first and second cameras 22 and 24 set in advance (S113).

The frequency of touches, angles, and the coordinates of the touch points extracted from each of the first and second cameras 22 and 24 can be stored in the first memory 80 (S116).

The digital processor 30 provides the frequency of touches, angles, and the coordinates of the touch points extracted from each of the first and second cameras 22 and 24 to the controller 40.

The controller 40 sums the frequency of touches extracted from the first camera 22 and the frequency of touches extracted from the second camera 24, selects a touch mode corresponding to the sum value from the second memory 85, and generates a control signal corresponding to the selected touch mode (S119).

Referring to FIG. 7, the sum values of the frequency of touches extracted from the first camera 22 and the frequency of touches extracted from the second camera 24, and the corresponding touch modes are set as a table in the second memory 85.

When the touch mode '1' is selected, a first control signal corresponding to the touch mode '1' can be generated. When the touch mode '2' is selected, a second control signal corresponding to the touch mode '2' can be generated.

When the touch mode '3' is selected, a third control signal corresponding to the touch mode '3' can be generated. When the touch mode '4' is selected, a fourth control signal corresponding to the touch mode '4' can be generated.

Meanwhile, when one of the touch modes '2' to '4' is selected, the controller 4 averages the angles of the touch points to compute an average angle, and computes the coordinate of a new touch point using the average angle (S122). The new touch point can be used as a reference point when a function which will be described later is performed.

The coordinate of the new touch point can be stored in the second memory 85 (S125).

The generated control signal can be provided to the operating system 50 together with the coordinate of the new touch point.

In the case where the touch mode '1' is selected, since this corresponds to the case where the user has performed one touch, a new touch point cannot be generated, and instead a touch point corresponding to one touch, stored in the first memory 80, and provided by the digital processor 30 can be provided to the operating system 50 together with the above-generated control signal.

The operating system 50 generates a command corresponding to the control signal, and provides the command to the user interface 60 together with a touch point corresponding to one touch provided by the digital processor 30, or a new touch point stored in the second memory 85 (S128).

The user interface 60 performs a specific function in response to the command (S131).

When the command is a first command corresponding to the first control signal provided by the controller 40, pressing of a mouse left button can be performed at a touch point corresponding to the one touch on the panel 70 in response to the first command.

When the command is a second command corresponding to the second control signal provided by the controller 40, pressing of a mouse right button can be performed at a new touch point on the panel 70 in response to the second command, and subsequently, a plurality of menus set in advance can be displayed.

When the command is a third command corresponding to the third control signal provided by the controller 40, a mouse scroll button can be performed in response to the third command. In this case, when a user touches the panel 70 and scrolls in one of up, down, left, and right directions, an image displayed on the panel 70 can be moved along the user's scroll direction from the new touch point on the panel 70.

When the command is a fourth command corresponding to the fourth control signal provided by the controller 40, a virtual keyboard can be turned on in response to the fourth command and displayed on the new touch point on the panel 70. In this case, when the user touches the panel 70 again, the virtual keyboard that is being displayed on the panel 70 can be removed.

When the user's touch does not exist any more, a touch function can be ended (S134).

Although the illustrated embodiment includes two cameras, the invention is not limited thereto but can be implemented using three or more cameras are provided.

Although the invention has been described as employing cameras to capture touch information, the invention is not limited thereto. For example the invention can be realized using in an IR matrix type image converter.

The present invention can set a plurality of touch modes and thus can realize the functions of a plurality of input/output units using the set plurality of touch modes. The technical effect of the present invention is to perform a plurality of functions using multi-touches on the panel and can be used in place of setting some icons on the panel to correspond to each function.

According to embodiments of the present invention, a plurality of cameras are provided, and various input/output functions can be realized according to the frequency of touches touched at a time, so that user convenience can be maximized.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for driving a multi-touch system, the method comprising:
    capturing image information including fingers touch points of a user touched on a panel by each of at least two camera for a set of frames;
    extracting using a digital processor both touch frequency and angle information of the user's touch points from the image information;
    summing the touch frequency from each camera without calculating positional information using a controller, wherein the touch frequency has a threshold of at least 2;
    selecting a touch mode on the basis of only the summed value of the touch frequencies using the controller;
    generating a control signal corresponding to the selected touch mode using the controller; and
    performing a touch function in response to the control signal using a user interface,
    wherein the image information comprises a touch frequency of at least one touch and at least one angle information.

2. The method according to claim 1, wherein the touch frequency is a count of concurrent touches in the image information captured by one of the cameras.

3. The method according to claim 1, wherein each camera generates the image information for each image frame in a set of frames for a display having a predetermined number.

4. The method according to claim 1, wherein the touch mode is selected when a sum value of the touch frequency of the at least one touch in the generated image information for the cameras is included within a range of sum values of the frequency of touches that correspond to the touch mode, for between 50 and 100% of the frames in the set of frames.

5. The method according to claim 1, wherein the touch function simulates pressing of a mouse left button.

6. The method according to claim 1, wherein the touch function simulates pressing of a mouse right button.

7. The method according to claim 1, wherein the touch function simulates pressing of a mouse scroll button.

8. The method according to claim 1, wherein the touch function performs toggling the state of a virtual keyboard between an off state and an on state.

9. The method according to claim 5, further comprising computing a coordinate of a touch point using the angles extracted from the image information of each of the cameras, the simulated pressing of the mouse left button being performed at the touch point.

10. The method according to claim 6, further comprising:
    averaging the angles of a user's touch points extracted from the image information of each of the cameras to compute an average angle for each camera; and
    computing a coordinate of a new touch point using the average angles,
    wherein simulating the pressing of the mouse right button is performed at the new touch point.

11. The method according to claim 7, further comprising:
    averaging the angles of the user's touch points extracted from the image information of each of the cameras to compute average angles; and
    computing a coordinate of a new touch point using the average angles, wherein an image displayed on a panel is moved from the new touch point along the user's scroll in a specific direction after simulating the pressing of the mouse scroll button.

12. The method according to claim 8, further comprising:
averaging the angles extracted from the each image information to compute average angles; and
computing a coordinate of a new touch point using the average angles,
wherein the virtual keyboard is displayed at the new touch point used as a reference.

13. The method according to claim 12, wherein the virtual keyboard that is being displayed is removed by another touch of the user.

14. A multi-touch system comprising:
at least two cameras, each capturing image information including fingers touch points of a user touched on a panel for a set of frames;
a digital processor calculating both touch frequency and angle information of the user's touch points from each image information without calculating positional information;
a controller summing the touch frequency from each image information, selecting a touch mode in response to only the summed value of the touch frequency and generating a control signal corresponding to the selected touch mode, wherein the touch frequency has a threshold of at least 2;
an operating system generating a command corresponding to the control signal to provide the command to the user interface; and
a user interface performing a touch function in response to the command,
wherein the image information comprises a touch frequency of at least one touch and at least one angle information.

15. The system according to claim 14, wherein the touch recognition unit includes at least two cameras.

16. The system according to claim 15, wherein the at least two cameras are disposed at corner regions of a panel.

17. The system according to claim 14, wherein the touch recognition unit includes a plurality of infrared sensors and a plurality of photo sensors.

18. The system according to claim 14, wherein the controller averages the angles extracted from the each image information to compute an average angle for reach image information, and computes a coordinate of a new touch point using the computed average angles to provide the new touch point to the user interface, and the user interface performs the touch function using the new touch point as a reference.

* * * * *